(12) United States Patent
Matsuhira (10) Patent No.: US 8,175,400 B2
(45) Date of Patent: May 8, 2012

(54) METHOD OF PROCESSING AND OUTPUTTING IMAGE, AND APPARATUS USING THE SAME

(75) Inventor: Masatoshi Matsuhira, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1368 days.

(21) Appl. No.: 11/545,418

(22) Filed: Oct. 11, 2006

(65) Prior Publication Data

US 2007/0081733 A1  Apr. 12, 2007

(30) Foreign Application Priority Data

Oct. 12, 2005  (JP) ................................. P2005-297276

(51) Int. Cl.
G06K 9/46  (2006.01)

(52) U.S. Cl. ......................................................... 382/245

(58) Field of Classification Search .......................... None
See application file for complete search history.

(56) References Cited

U.S. PATENT DOCUMENTS

| | | | | |
|---|---|---|---|---|
| 5,016,118 A * | 5/1991 | Nannichi | ...................... | 358/462 |
| 5,539,842 A * | 7/1996 | Schwartz | ...................... | 382/232 |
| 5,696,842 A * | 12/1997 | Shirasawa et al. | ............ | 382/176 |
| 5,742,703 A * | 4/1998 | Lin et al. | ........................ | 382/176 |
| 5,742,704 A * | 4/1998 | Suzuki et al. | ................. | 382/176 |
| 5,835,923 A * | 11/1998 | Shibata et al. | ................. | 715/246 |
| 5,991,448 A * | 11/1999 | Go | ................................. | 382/236 |
| 6,005,979 A * | 12/1999 | Chang et al. | ................... | 382/232 |
| 6,307,962 B1 * | 10/2001 | Parker et al. | ................... | 382/170 |
| 6,360,006 B1 * | 3/2002 | Wang | ............................ | 382/162 |
| 6,404,919 B1 * | 6/2002 | Nishigaki et al. | .............. | 382/176 |
| 6,735,341 B1 * | 5/2004 | Horie et al. | .................... | 382/239 |
| 6,766,055 B2 * | 7/2004 | Matsugu et al. | ............... | 382/173 |
| 7,218,784 B1 * | 5/2007 | Zeck et al. | ..................... | 382/232 |
| 7,612,911 B2 | 11/2009 | Kakutani | | |

FOREIGN PATENT DOCUMENTS

| | | |
|---|---|---|
| JP | 4-356873 A | 12/1992 |
| JP | 06-178122 A | 6/1994 |
| JP | 7-87315 A | 3/1995 |
| JP | 2004-289274 A | 10/2004 |

* cited by examiner

*Primary Examiner* — Yuzhen Ge
(74) *Attorney, Agent, or Firm* — Sughrue Mion, PLLC (57) ABSTRACT

In order to process image data including a plurality of pixels, a plurality of pixel groups, each of which includes a plurality of pixels, are extracted from the image data sequentially. Next, it is judged whether each of the pixel groups includes only at least one of a white pixel and a black pixel. At least one first pixel group in the pixel groups is binarized in accordance with an arrangement of the at least one of the white pixel and the black pixel therein, in a case where it is judged that the first pixel group includes only at least one of the white pixel and the black pixel, thereby generating at least one first data item. A first resolution of at least one second pixel group in the pixel groups is reduced to a second resolution, in a case where it is judged that the second pixel group includes at least one pixel other than the white pixel and the black pixel, thereby generating at least one second data item.

4 Claims, 9 Drawing Sheets

| A | B | C | D | BINARY DATA (4bit) |
|---|---|---|---|---|
| 0 | 0 | 0 | 0 | 0000 |
| 0 | 0 | 0 | 255 | 0001 |
| 0 | 0 | 255 | 0 | 0010 |
| 0 | 0 | 255 | 255 | 0011 |
| 0 | 255 | 0 | 0 | 0100 |
| 0 | 255 | 0 | 255 | 0101 |
| 0 | 255 | 255 | 0 | 0110 |
| 0 | 255 | 255 | 255 | 0111 |
| 255 | 0 | 0 | 0 | 1000 |
| 255 | 0 | 0 | 255 | 1001 |
| 255 | 0 | 255 | 0 | 1010 |
| 255 | 0 | 255 | 255 | 1011 |
| 255 | 255 | 0 | 0 | 1100 |
| 255 | 255 | 0 | 255 | 1101 |
| 255 | 255 | 255 | 0 | 1110 |
| 255 | 255 | 255 | 255 | 1111 |

METHOD OF PROCESSING AND OUTPUTTING IMAGE, AND APPARATUS USING THE SAME

BACKGROUND

1. Technical Field

The present invention relates to a technique of compressing image data composed of a plurality of pixels and a technique of decoding and outputting the compressed image data.

2. Related Art

In general, when outputting an image, such as a natural image, having smooth density variation by using an image output apparatus such as a printer, an image quality sufficient for common use can be obtained if the image is output with resolution of about 360 dpi×360 dpi. However, when printing an image, such as a character or a symbol, having abrupt density variation, edges of the image are blurred or the line thickness becomes non-uniform in the case of resolution of about 360 dpi×360 dpi, which causes the image quality to deteriorate.

Therefore, in order to secure the image quality of an image including a character or a symbol, it may be considered to output the image with the resolution of 720 dpi×720 dpi, for example. However, in this case, since the data capacity of image data increases, it is necessary to increase the capacity of a memory mounted in the image output apparatus as much as the increased data capacity. In addition, according to the increase of the data capacity, an interface by which the image data is transmitted from an image processing apparatus, such as a computer, to an image output apparatus needs to be adapted to high speed.

In connection with the above-mentioned problems, for example, in Japanese Patent Publication No. 7-87315A (JP-A-7-87315), the resolution is dynamically changed according to the complexity of a pixel configuration of a part of image data, thereby reducing the data capacity.

Furthermore, in Japanese Patent Publication No. 4-356873A (JP-A-4-356873), image data is subjected to various image processing, such as MTF correction or white background extraction, and a character region and a natural image region are separated from each other. Then, different compression methods are applied to these regions, thereby compressing the image data at high compression rate. Specifically, a reversible entropy coding processing is executed for the character region and a irreversible ADCT (adaptive discrete cosine transform) coding processing is executed for the natural image region.

However, in JP-A-7-87315 described above, depending on whether or not a predetermined pixel pattern continues, the complexity of a corresponding region is determined. Accordingly, a complex operation processing should be executed until the resolution switches.

On the other hand, in JP-A-4-356873 described above, it is difficult to determine the separation between the character region and the natural image region. In addition, since different compression methods are applied to these regions, two different kinds of hardware that performs a compression and two different kinds of hardware that performs a decoding corresponding to the compression methods are needed, which causes the configuration of a device to be complicated.

SUMMARY

It is therefore an advantage of some aspect of the invention to reduce the capacity of image data and to improve the image quality of an output image with a configuration simpler than that in the related art.

According to one aspect of the invention, there is provided a method of processing image data including a plurality of pixels, comprising:

extracting a plurality of pixel groups, each of which includes a plurality of pixels, from the image data sequentially;

judging whether each of the pixel groups includes only at least one of a white pixel and a black pixel;

binarizing at least one first pixel group in the pixel groups in accordance with an arrangement of the at least one of the white pixel and the black pixel therein, in a case where it is judged that the first pixel group includes only at least one of the white pixel and the black pixel, thereby generating at least one first data item; and reducing a first resolution of at least one second pixel group in the pixel groups to a second resolution, in a case where it is judged that the second pixel group includes at least one pixel other than the white pixel and the black pixel, thereby generating at least one second data item.

The method may further comprise:

counting a first number that a plurality of first data items having the same value are generated consecutively;

counting a second number that a plurality of the second data items having the same value are generated consecutively;

compressing the first data items in accordance with the first number, in a case where the first number is obtained, thereby generating first compressed data; and compressing the second data items in accordance with the second number, in a case where the second number is obtained, thereby generating second compressed data.

The first compressed data may be generated so as to include a first identifier indicative of the first data item and first count data indicative of the first number. The second compressed data may be generated so as to include a second identifier indicative of the second data item and second count data indicative of the second number.

The method may further comprise:

counting a third number that a plurality of first data items having different values are generated consecutively;

counting a fourth number that a plurality of the second data items having different values are generated consecutively;

compressing the first data items in accordance with the third number, in a case where the third number is obtained, thereby generating third compressed data; and compressing the second data items in accordance with the fourth number, in a case where the fourth number is obtained, thereby generating fourth compressed data.

The third compressed data may be generated so as to include the first identifier and third count data indicative of the third number. The fourth compressed data may be generated so as to include the second identifier and fourth count data indicative of the fourth number.

A data length of the first count data may be different from a data length of the second count data. A data length of the first compressed data may be different from a data length of the second compressed data.

A data length of the third count data may be different from a data length of the fourth count data. A data length of the third compressed data may be different from a data length of the fourth compressed data.

The second data item may be generated by averaging density values of the pixels in the second pixel group.

The method may further comprise:

decoding the first compressed data in accordance with the first identifier and the first count data, thereby obtaining the first data item;

decoding the second compressed data in accordance with the second identifier and the second count data, thereby obtaining the second data item;

reproducing the pixels in the first pixel group from the first data item by reproducing the arrangement of the at least one of the white pixel and the black pixel;

reproducing the pixels in the second pixel group from the second data item by enhancing the second resolution to the first resolution; and outputting an image including the reproduced pixels.

The reproduction of the second pixel group may include a color correction in accordance with a condition of the outputting of the image.

The color correction may include at least one of a color space conversion and a gamma correction.

According to one aspect of the invention, there is also provided an apparatus, operable to process image data including a plurality of pixels, comprising:

an extractor, operable to extract a plurality of pixel groups, each of which includes a plurality of pixels, from the image data sequentially;

a judge, operable to judge whether each of the pixel groups includes only at least one of a white pixel and a black pixel;

a binarizer, operable to binarize at least one first pixel group in the pixel groups in accordance with an arrangement of the at least one of the white pixel and the black pixel therein, in a case where the judge judges that the first pixel group includes only at least one of the white pixel and the black pixel, thereby generating at least one first data item; and a resolution reducer, operable to reduce a first resolution of at least one second pixel group in the pixel groups to a second resolution, in a case where the judge judges that the second pixel group includes at least one pixel other than the white pixel and the black pixel, thereby generating at least one second data item.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below in detail with reference to the accompanying drawings.

Figure 1:
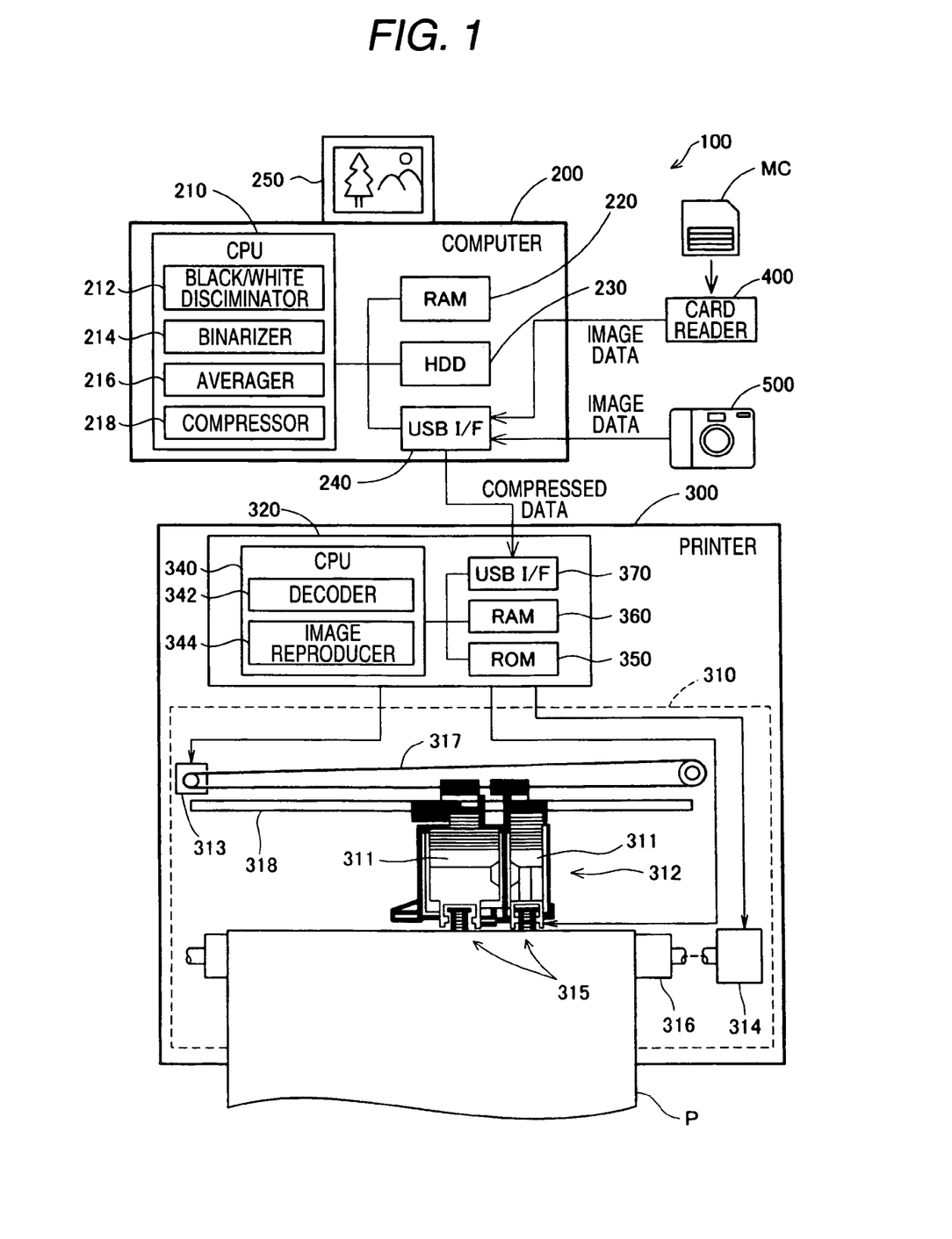
FIG. 1 is a schematic view showing a hardware configuration of a printing system according to one embodiment of the invention.

As shown in FIG. 1, a printing system 100 according to one embodiment of the invention includes a computer 200 serving as an image processing apparatus and a printer 300 serving as an image output apparatus.

The computer 200 is a general-purpose personal computer and includes a CPU 210, a RAM 220, a hard disk drive 230, and a USB interface 240. The CPU 210, the RAM 220, the hard disk drive 230, and the USB interface 240 are connected to one another through a bus.

A card reader 400 that reads and writes a memory card MC, a digital camera 500, a printer 300, and the like are connected to the USB interface 240. The computer 200 is input with image data, which is stored in the memory card MC or the digital camera 500, through the USB interface 240. In addition, through the USB interface 240, the computer 200 makes an image displayed on a monitor 250 or the image printed by the printer 300.

The hard disk drive 230 is installed with an operating system, a printer driver, or the like. When the computer 200 starts operating, the CPU 210 loads the programs to a memory and then runs the programs, thereby serving as a black/white discriminator 212, a binarizer 214, an averager 216, and a compressor 218.

The black/white discriminator 212 sequentially extracts a pixel group having 2×2 pixels from an image input from the memory card MC or the digital camera 500 and determines whether or not the pixel group is a black and white pattern composed of black and white pixels.

If the black/white discriminator 212 determines that the pixel group is a black and white pattern, the binarizer 214 binarizes the pixel group according to the arrangement of the black and white pixels so as to generate binary data.

If the black/white discriminator 212 determines that the pixel group is not a black and white pattern, the averager 216 averages gradation values (density values) within the pixel group so as to generate low-resolution data having reduced resolution.

The compressor 218 compresses the binary data generated by the binarizer 214 and the low-resolution data generated by the averager 216 by using algorithm called as a run-length method. The compression algorithm will be described in detail later. The compressed data compressed by the compressor 218 is transmitted to the printer 300, which is connected to the computer 200, through the USB interface 240.

The printer 300 includes a printing mechanism 310, which forms dots by ejecting ink onto a printing sheet P, and a controller 320 that controls the printing mechanism 310.

The printing mechanism 310 is configured to include a carriage 312 mounted with an ink cartridge 311, a carriage motor 313 that drives the carriage 312 in a primary scanning direction, a sheet feeding motor 314 that carries the printing sheet P in a secondary scanning direction.

The carriage 312 has totally six ink heads 315 corresponding to ink components having colors of cyan (C), magenta (M), yellow (Y), black (K), light cyan (Lc), and light magenta (Lm). The carriage 312 is mounted with the ink cartridge 311 containing the ink components therein. Ink, which is supplied from the ink cartridge 311 to the ink head 315, is ejected onto the printing sheet P by the driving of a piezoelectric element (not shown).

The carriage 312 is movably held on a sliding shaft 318 that is provided in parallel with the axis direction of a platen 316 by which the printing sheet P is fed. The carriage motor 313 rotates a driving belt 317 in response to an instruction from the controller 320, such that the carriage 312 reciprocates in parallel with the axis direction of the platen 316, that is, in the primary scanning direction.

The sheet feeding motor 314 serves to rotate the platen 316 in response to the instruction from the controller 320 so as to carry the printing sheet P in a direction perpendicular to the axis direction of the platen 316. In other words, the sheet feeding motor 314 serves to move the carriage 312 relatively in the secondary scanning direction.

The controller 320 serves to control an operation of the ink head 315, the carriage motor 313, or the sheet feeding motor 314. The controller 320 includes a CPU 340, a ROM 350, a RAM 360, and a USB interface 370.

The USB interface 370 is connected to the USB interface 240 of the computer 200. The printer 300 receives the compressed data, which is transmitted from the computer 200, through the USB interface 370.

A control program for controlling an operation of the printer 300 is stored in the ROM 350. When the printer 300 starts operating, the CPU 340 loads the control program to the RAM 360 and then runs the control program, thereby serving as a decoder 342 and an image reproducer 344.

The decoder 342 decodes compressed data, which is transmitted from the computer 200 through the USB interface 370, on the basis of the run-length method.

The image reproducer 344 reproduces an image on the basis of data decoded by the decoder 342. Specifically, the image reproducer 344 reproduces an image to have a state before the image is divided into pixel groups by, in the case of binary data, arranging white or black pixels with respect to a pixel group having 2×2 pixels according to bit states of the binary data and, in the case of low-resolution data, increasing the resolution up to resolution equal to that of the pixel group having 2×2 pixels.

Figure 2:
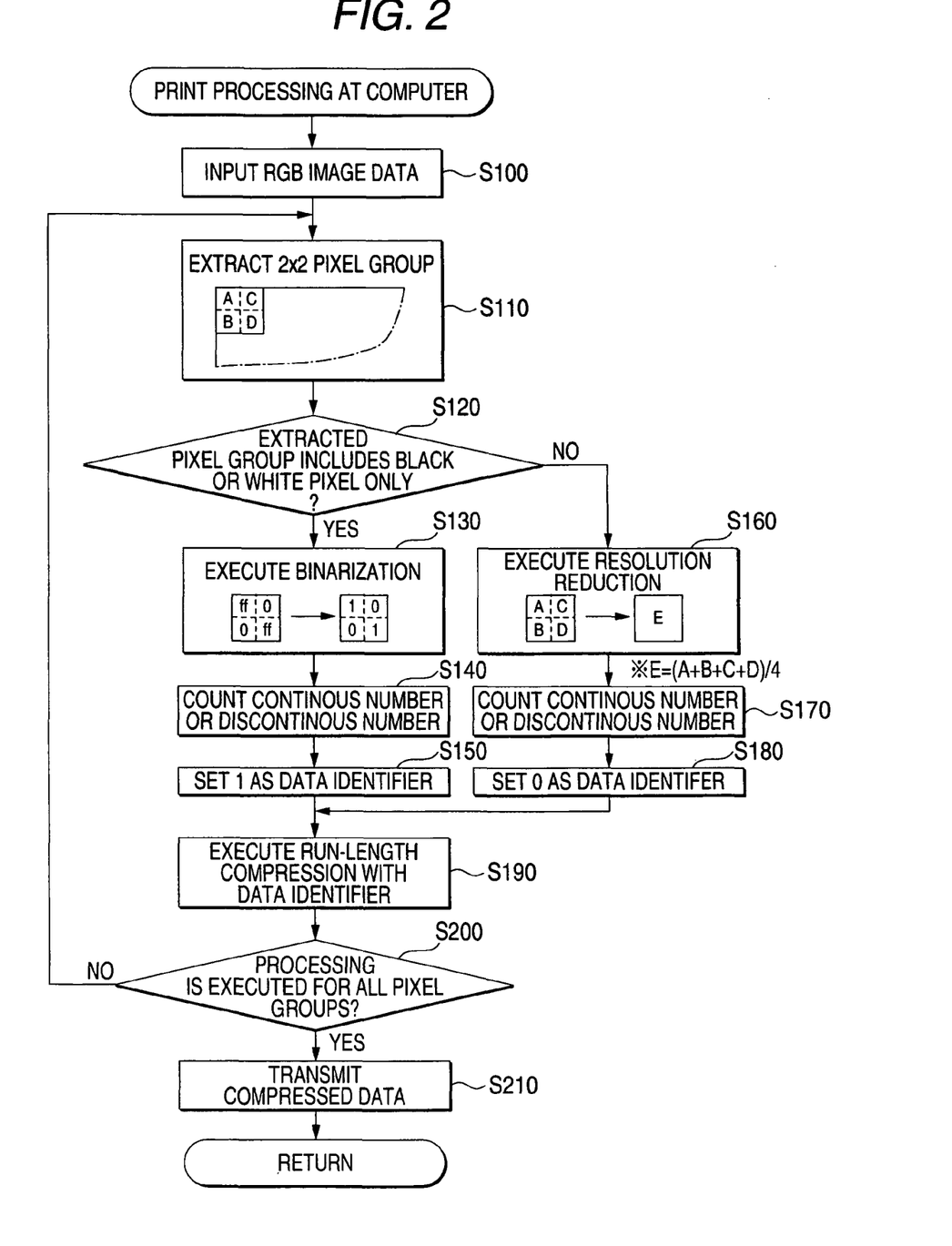
FIG. 2 is a flowchart showing a print processing executed by a computer in the printing system.

A print processing shown in FIG. 2 is a processing executed by the CPU 210 of the computer 200 when a user specifies image data to be printed.

When the print processing is executed, first, the CPU 210 of the computer 200 is input with image data, which is based on an RGB format and has been specified by the user, from the memory card MC, the digital camera 500, or the hard disk drive 230 (step S100). In the present embodiment, it is assumed that the image data input from the memory card MC, the digital camera 500, or the hard disk drive 230 has resolution of 720 dpi×720 dpi.

When the image data is input, the CPU 210 extracts a pixel group having 2×2 pixels from the image data by using the black/white discriminator 212 (step S100). Then, it is determined whether or not the extracted pixel group is a black and white pattern composed of only pixels corresponding to a white color (where, (R, G, B)=(255, 255, 255)) and a black color (where, (R, G, B)=(0, 0, 0)) (step S120). Moreover, in the present embodiment, in addition to the pattern composed of the white color and the black color, a pattern composed of only a white color and a pattern composed of only a black color are also assumed to be included in the black and white pattern.

In step S120, if the pixel group is determined to be a black and white pattern (step S120: Yes), the CPU 210 converts RGB data to binary data according to the arrangement of the black and white pixels within the pixel group by using the binarizer 214 (step S130). Specifically, a white portion within the pixel group is set to '1', and a black portion within the pixel group is set to '0'.

Figure 3A:
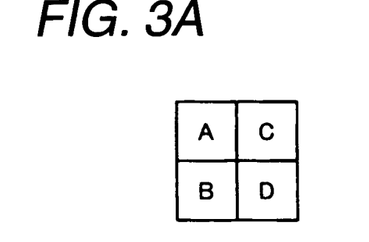
FIGS. 3A and 3B are diagrams for explaining binarization in the print processing.
Figure 3B:
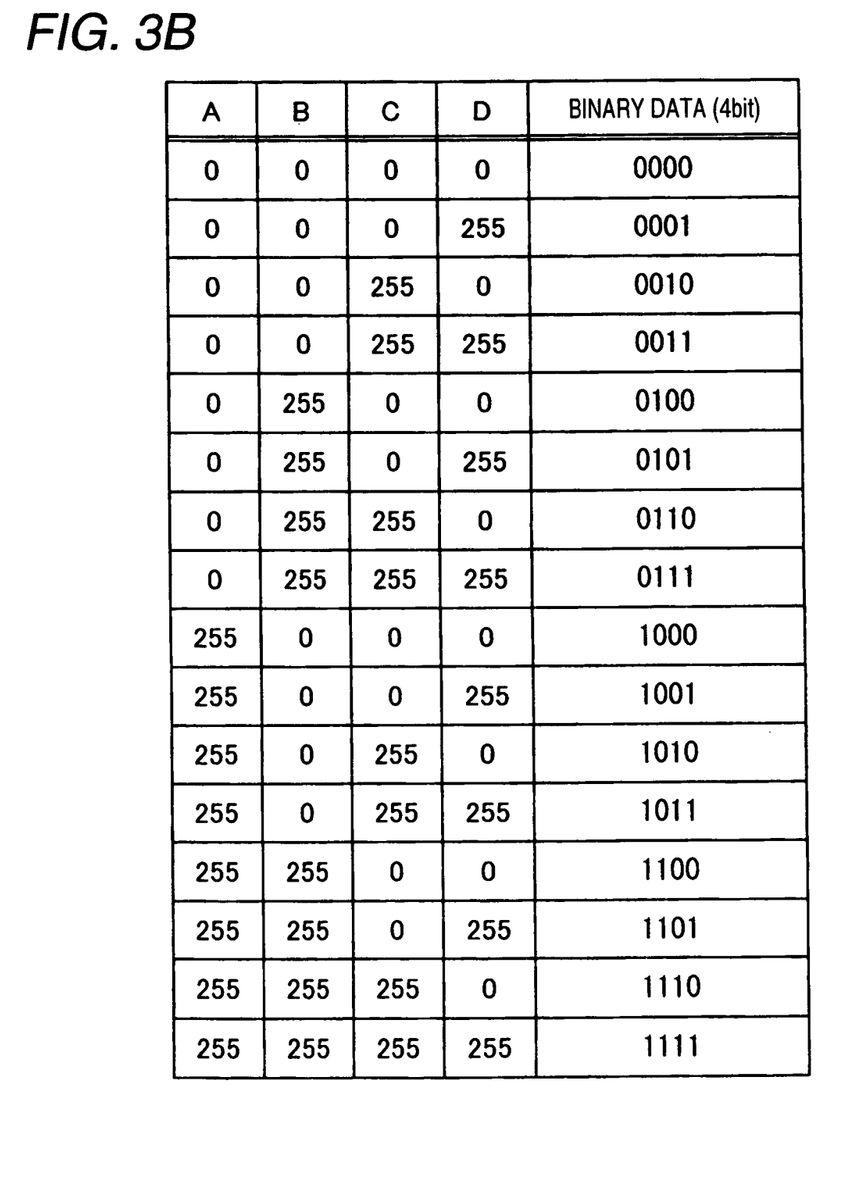

As shown in FIG. 3A, assuming that an upper left pixel is 'A', a lower left pixel is 'B', an upper right pixel is 'C', and a lower right pixel is 'D' among four pixel forming a pixel group, for example, RGB data of the pixel group is converted to 4-bit data of '0001' in the case of (A, B, C, D)=(black, black, black, white), that is, (A, B, C, D)=(0, 0, 0, 255) as shown in FIG. 3B. Similarly, the RGB data of the pixel group is converted to 4-bit data of '0010' in the case of (A, B, C, D)=(black, black, white, black), that is, (A, B, C, D)=(0, 0, 255, 0). In the binarization, since 8-bit data corresponding to R, 8-bit data corresponding to G, and 8-bit data corresponding to B, that is, totally 24-bit data is converted to 4-bit data, the data capacity can be greatly reduced while maintaining the resolution (720 dpi×720 dpi) of an original pixel group.

Referring back to FIG. 2, if the contents of binary data, which has been sequentially converted in step S130, are the same, the CPU 210 counts a number (continuous number RL1), the binary data having the same contents being continuously generated as many as the continuous number RL1 (step S140). In contrast, if the contents of the binary data sequentially converted in step S130 are different, the CPU 210 counts a number (discontinuous number RL0), the binary data having different contents being continuously generated as many as the discontinuous number RL0 (step S140). The continuous number RL1 and the discontinuous number RL0 are parameters used at the time of run-length compression to be described later.

After counting the continuous number RL1 or the discontinuous number RL0 in step S140, the CPU 210 sets a data identifier, which indicates the type of data to be run-length compressed, to '1' indicating binary data (step S150). The data identifier is also a parameter used at the time of the run-length compression to be described later.

In step S120, if it is determined that the pixel group is not a black and white pattern, that is, in the case when at least a pixel having a color other than black and white colors is included in the pixel group (step S120: No), the CPU 210 averages the gradation values within the pixel group by using the averager 216, thereby generating low-resolution data whose resolution has been reduced from 720 dpi×720 dpi to 360 dpi×360 dpi (step S160). Specifically, an average value of the gradation values of the four pixels is obtained by the following operations. That is, it is assumed that the gradation values of the four pixels A, B, C, and D are as follows.

$$A=(Ra, Ga, Ba)$$

$$B=(Rb, Gb, Bb)$$

$$C=(Rc, Gc, Bc)$$

$$D=(Rd, Gd, Bd)$$

The resolution reduction may be performed according to a divisor of the number of pixels forming a pixel group. For example, if the pixel group is composed of six pixels, the resolution of the pixel group may be reduced to ⅓, ½, or ⅙. In addition, if the pixel group is composed of four pixels, the resolution of the pixel group may be reduced to ½ or ¼. In this case, the limit of the resolution reduction is resolution obtained by dividing resolution of original image data by the number of pixels forming the pixel group.

In this case, a gradation value (R, G, B) of a pixel after conversion to low resolution is calculated as follows.

$$R=(Ra+Rb+Rc+Rd)/4$$

$$G=(Ga+Gb+Gc+Gd)/4$$

$$B=(Ba+Bb+Bc+Bd)/4$$

After low-resolution data is generated from the pixel group in step S160, if the contents of the low-resolution data, which has been sequentially generated, are the same, the CPU 210 counts a number (continuous number RL1), the low-resolution data having the same contents being continuously generated as many as the continuous number RL1 (step S170). In contrast, if the contents of the low-resolution data, which has been sequentially generated, are different, the CPU 210 counts a number (discontinuous number RL0), the low-resolution data having different contents being continuously generated as many as the discontinuous number RL0 (step S170).

After counting the continuous number RL1 or the discontinuous number RL0 in step S170, the CPU 210 sets a data identifier, which indicates the type of data to be run-length compressed, to '0' indicating low-resolution data (step S180).

After the data identifier is set in step S150 or S180, the CPU 210 performs a run-length compression with respect to the binary data or the low-resolution data on the basis of the data identifier and the continuous number RL1 or the discontinuous number RL0 by using the compressor 218 (step S190). The run-length compression will be described in detail later.

After performing the run-length compression, the CPU 210 determines whether or not the run-length compression has been completed with respect to all pixel groups within the RGB image data input in step S100 (step S200). As a result of the determination, if the run-length compression has been completed with respect to all of the pixel groups (step S200: Yes), the CPU 210 transmits compressed data, which has been obtained by the run-length compression, to the printer 300 through the USB interface 240 (step S210). On the other hand, if the run-length compression has not been completed with respect to all of the pixel groups (step S200: No), the processing returns to step S110 in which the run-length compression is again executed with respect to the other pixel groups that are not run-length compressed.

Hereinafter, the run-length compression executed in step S190 of the print processing will be described in detail.

Figure 4:
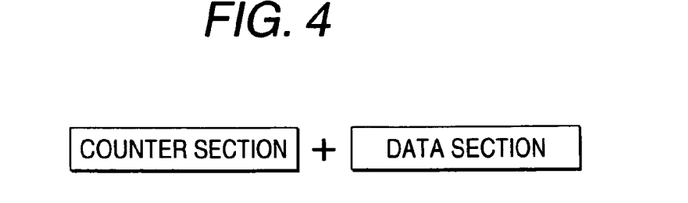
FIG. 4 is a diagram showing a configuration of run-length data obtained in the print processing.

As shown in FIG. 4, the run-length data of the present embodiment basically includes a counter section composed of four or more bits and a data section composed of four or more bits. In the following description, data having a set of the counter section and the data section is called as 'run-length data'. In addition, data obtained by run-length compressing all of the pixel groups within image data is called as 'compressed data'.

Figure 5A:
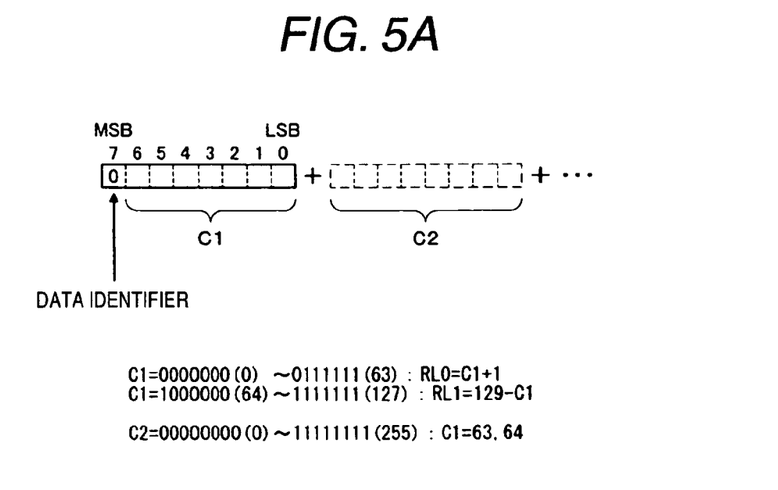
FIG. 5A is a diagram showing a configuration of a counter section in the run-length data, in a case where low-resolution data is compressed.

As shown in FIG. 5A, when the low-resolution data is run-length compressed, a counter section is set to have 8-bit data length and a data identifier is set in a most significant bit (MSB) of the counter section. As described above, when the low-resolution data is run-length compressed, '0' is set as the data identifier (refer to step S180 of FIG. 2).

In seven bits subsequent to the MSB of the counter section, a counter C1 indicating a continuous number RL1 or a discontinuous number RL0 of the low-resolution data, which has been counted in step S170, is set. It is assumed that the counter C1 indicates a discontinuous number RL0 (=C1+1) when a value of the counter C1 is within a range of 0 to 63, and the counter C1 indicates a continuous number RL1 (=129−C1) when the value of the counter C1 is within a range of 64 to 127. In other words, according to the range of the value of the counter C1, it is possible to identify whether a set number is the continuous number RL1 or the discontinuous number RL0.

In the case when the discontinuous number RL0 or the continuous number RL1 is a maximum value, that is, when the value of the counter C1 is 63 or 64, an 8-bit counter C2 subsequent to the counter C1 is prepared. The counter C2 has a value within a range of 0 to 255. If the value of the counter C2 becomes 255, a counter C3 follows, and then until a value of a counter reaches 255, subsequent counters C4, C5, ... follow. The continuous number RL1 or the discontinuous number RL0 is obtained by adding values indicated by respective counters.

Figure 5B:
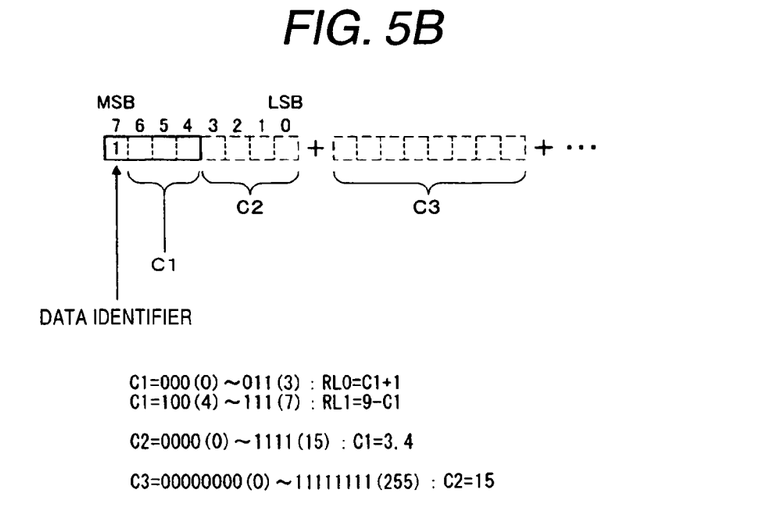
FIG. 5B is a diagram showing a configuration of a counter section in the run-length data, in a case where binary data is compressed.

As shown in FIG. 5B, when the binary data is run-length compressed, a counter section is set to have 4-bit data length and a data identifier is set in a most significant bit (MSB) of the counter section. As described above, when the binary data is run-length compressed, '1' is set as the data identifier (refer to step S150 of FIG. 2).

As described above, as compared with the case in which a counter section is set to have 8-bit data length when the low-resolution data is run-length compressed (refer to FIG. 5A), a counter section is basically set to have 4-bit data length when the binary data is run-length compressed (refer to FIG. 5B). That is, in the run-length compression according to the present embodiment, the data length of a counter section varies according to the type of data to be compressed, that is, the state of the data identifier. Since the low-resolution data is information indicating 8-bit gradation values corresponding to each of the RGB colors, the counter section is set to have 8-bit data length when the low-resolution data is compressed, for the purpose of matching with that described above. On the other hand, since the binary data is 4-bit information, the counter section is set to have 4-bit data length when the binary data is compressed, for the purpose of matching with that described above.

In addition, since it is considered that the binary data corresponds to a portion, such as a character, in many cases and has a small amount of repeated parts, data indicating the count number may be set to have about 4-bit data length. On the other hand, since it is considered that the low-resolution data corresponds to a portion, such as a natural image, in many case and has a large amount of repeated parts, the data indicating the count number may be set to have about 8-bit data length.

In three bits subsequent to the MSB of the counter section, a counter C1 indicating a continuous number RL1 or a discontinuous number RL0 of the binary data, which has been counted in step S140, is set. It is assumed that the counter C1 indicates a discontinuous number RL0 (=C1+1) when a value of the counter C1 is within a range of 0 to 3, and the counter C1 indicates a continuous number RL1 (=9−C1) when the value of the counter C1 is within a range of 4 to 7. In other words, according to the range of the value of the counter C1, it is possible to identify whether a set number is the continuous number RL1 or the discontinuous number RL0.

In the case when the discontinuous number RL0 or the continuous number RL1 is a maximum value, that is, when the value of the counter C1 is 3 or 4, a 4-bit counter C2 subsequent to the counter C1 is prepared. The counter C2 has a value within a range of 0 to 15. If the discontinuous number RL0 or the continuous number RL1 is less than the maximum value, binary data is set as data section in the counter C2. Further, if the value of the counter C2 becomes 15, an 8-bit counter C3 follows, and then until a value of a counter reaches 255, subsequent 8-bit counters C4, C5, ... follow. The continuous number RL1 or the discontinuous number RL0 is obtained by adding values indicated by respective counters.

Figure 6A:
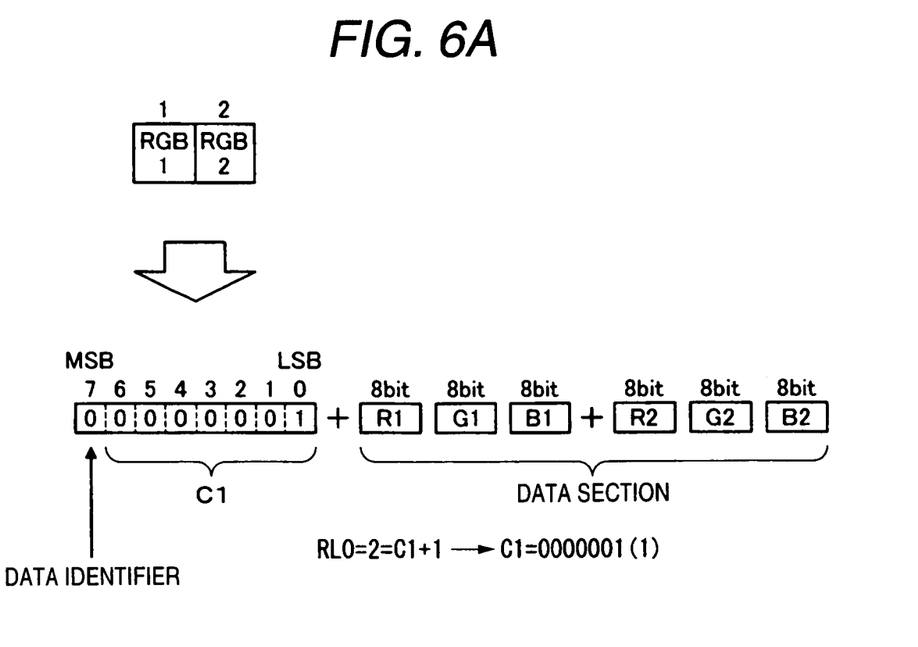
FIGS. 6A and 6B are diagrams showing how to execute run-length compression with respect to the low-resolution data.

FIG. 6A illustrates an example in which the discontinuous number RL0 of low-resolution data is 2. In this case, as shown in an upper part of FIG. 6A, two low-resolution data items having different RGB values are continuously arranged before being compressed. If the two low-resolution data items having different RGB values are run-length compressed, as shown in a lower part of FIG. 6A, first, '0' indicating low-resolution data is set as data identifier in an MSB of a first 8-bit counter section. Then, for subsequent 7-bit counter C1, a value of C1 (=RL0−1) is set as 1 (0000001) such that the discontinuous number RL0 becomes 2. After configuring the counter section as described above, subsequently, RGB data (8-bit data for each R, G, and B) of the first low-resolution data and RGB data (8-bit data for each R, G, and B) of the second low-resolution data are set in a data section.

Figure 6B:
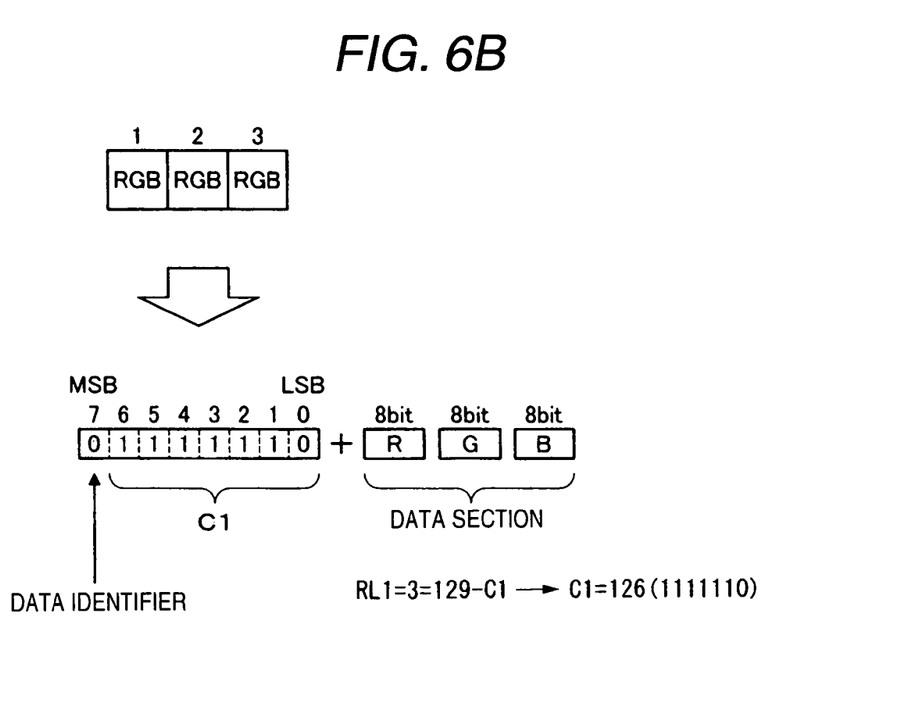

FIG. 6B illustrates a compression example in which the continuous number RL1 of low-resolution data is 3. In this case, as shown in an upper part of FIG. 6B, three low-resolution data items having the same RGB values are continuously arranged before being compressed. If the three low-resolution data items having the same RGB values are run-length compressed, as shown in a lower part of FIG. 6B, first, '0' indicating low-resolution data is set as data identifier in an MSB of a first 8-bit counter section. Then, for subsequent 7-bit counter C1, a value of C1 (=129−RL0) is set as 126 (1111110) such that the continuous number RL1 becomes 3. After configuring the counter section as described above, subsequently, the same RGB data (8-bit data for each R, G, and B) common to the three low-resolution data is set in a data section.

Figure 7A:
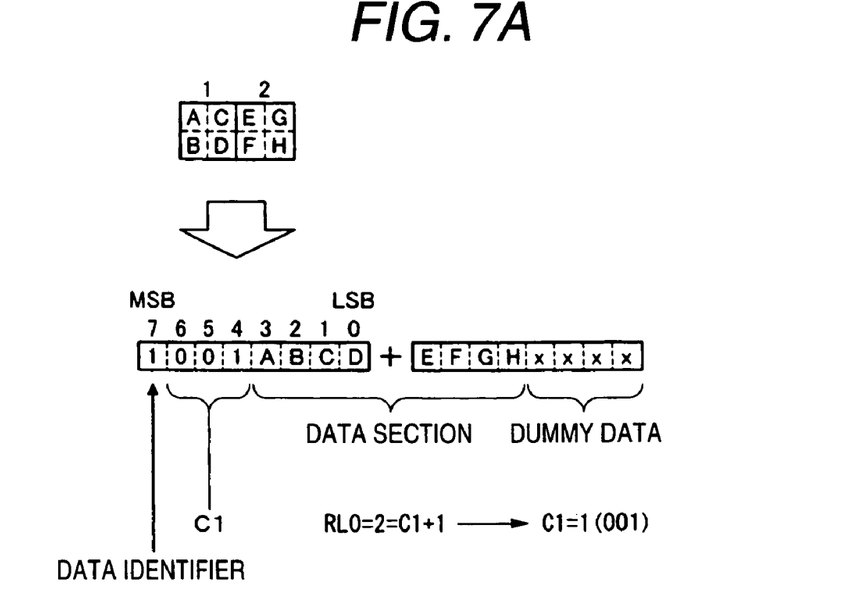
FIGS. 7A and 7B are diagrams showing how to execute run-length compression with respect to the binary data.

FIG. 7A illustrates an example in which the discontinuous number RL0 of binary data is 2. In this case, as shown in an upper part of FIG. 7A, two binary data items ABCD and EFGH having different arrangements of black and white pixels are continuously arranged before being compressed. If the two binary data items having different arrangements of black and white pixels are run-length compressed, as shown in a lower part of FIG. 7B, first, '1' indicating binary data is set as data identifier in an MSB of a first 4-bit counter section. Then, for subsequent 3-bit counter C1, a value of C1 (=RL0−1) is set as 1 (001) such that the discontinuous number RL0 becomes 2. After configuring the counter section as described above, subsequently, the first binary data ABCD and the second binary data EFGH are set in a data section. The second binary data is set in upper four bits of a second byte forming the run-length data. For this reason, dummy data 'xxxx' is set in lower four bits of the second byte for the purpose of data length matching. The dummy data has a predetermined value, for example, may be set as '0000'.

Figure 7B:
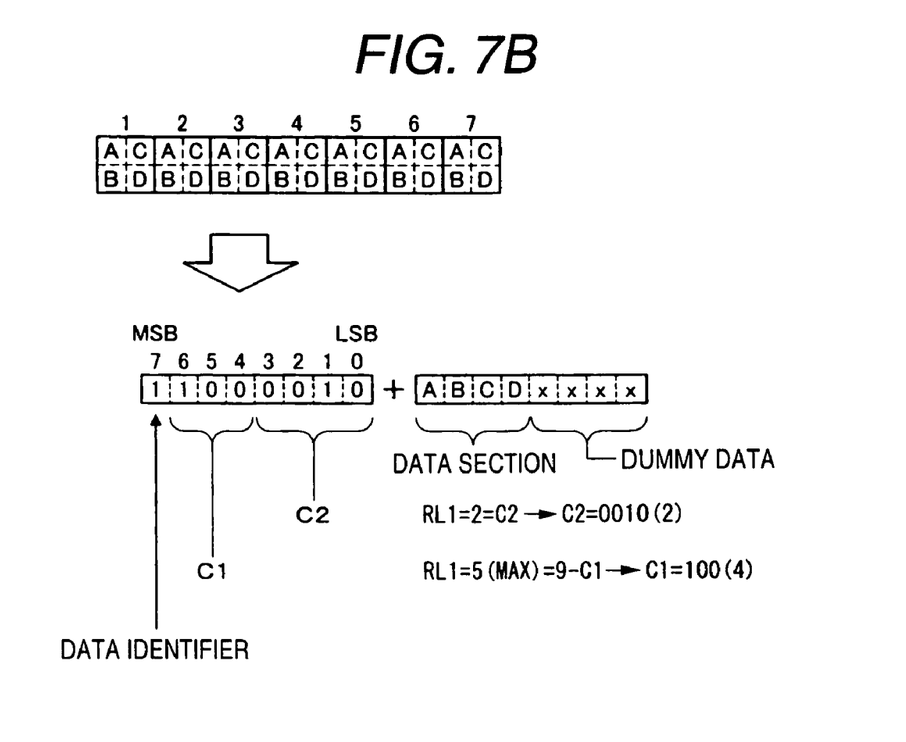

FIG. 7B illustrates a compression example in which the continuous number RL1 of binary data is 7. In this case, as shown in an upper part of FIG. 7B, seven binary data items having the same arrangement of black and white pixels are continuously arranged before being compressed. If the seven binary data items having the same arrangement of black and white pixels are run-length compressed, as shown in a lower part of FIG. 7B, first, '1' indicating binary data is set as data identifier in an MSB of a first 4-bit counter section. Then, for subsequent 3-bit counter C1 and 4-bit counter C2, a value of C1 is set as 4 (100) and a value of C2 is set as 2 (0010) such that the continuous number RL1 becomes 7. Since maximum 5 can be set as the continuous number RL1 in the counter C1, the value of C2 becomes 2, which is obtained by subtracting 5 from 7. After configuring the counter section as described above, subsequently, a data item ABCD common to the seven data is set in a data section. Since the binary data is set in upper four bits of a second byte forming the run-length data, dummy data is set in lower four bits of the second byte for the purpose of data length matching.

As shown in FIGS. 6A and 6B, in the case when the low-resolution data is run-length compressed, the data section is basically configured to have 24-bit data length (8 bits for each R, G, and B). On the other hand, as shown in FIGS. 7A and 7B, in the case when the binary data is run-length compressed, the data section is configured to have 4-bit data length. That is, in the run-length compression according to the present embodiment, the data length of a counter section varies according to the type of data to be compressed, that is, the state of the data identifier.

Figure 8:
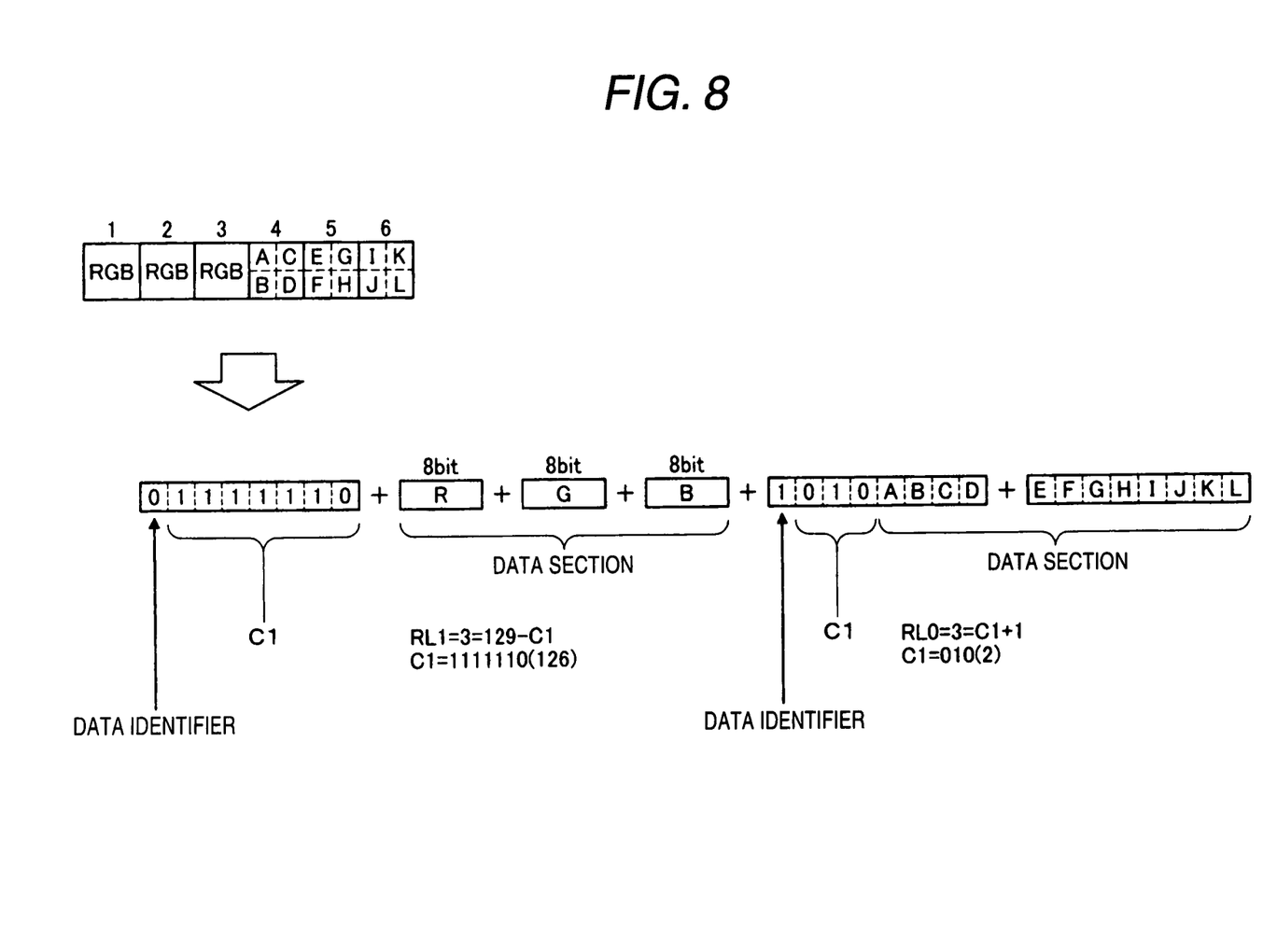
FIG. 8 is a diagram showing how to execute run-length compression with respect to data including the low-resolution data and the binary data.

Referring to an upper part of FIG. 8, image data, in which three low-resolution data items having the same RGB values are continuously arranged and three binary data having different arrangements of black and white pixels are continuously arranged, is shown as data before being compressed. As shown in a lower part of FIG. 8, if the data is run-length compressed, first, '0', which serves as data identifier and indicates low-resolution data, and a counter section, in which a value of a counter C1 is set as 126 (1111110) such that the continuous number RL1 becomes 3, are prepared. Then, subsequent to those described above, a set of RGB data having the same RGB value is prepared as a data section. In addition, '1', which serves as data identifier and indicates binary data, and a counter section, in which a value of a counter C1 is set as 2 (010) such that the discontinuous number RL0 becomes 3, are prepared. Then, subsequent to those described above, a data section in which three binary data items having different arrangements of black and white pixels are set is prepared.

According to the example of the run-length compression shown in FIG. 8, data before being compressed includes three low-resolution data items, each of which has an 8-bit data capacity for each R, G, and B, and three binary data items each having a 4-bit data capacity. Accordingly, the data before being compressed has a totally 84-bit (=(8 bits×3 colors)×3+4 bits×3) data capacity. On the other hand, as shown in the lower part of FIG. 8, after the data is compressed, the data has a data capacity corresponding to totally 48 (=8+8+8+8+8+8) bits. Thus, the data capacity after the compression is reduced to about half of the data capacity before the compression.

Furthermore, of the data shown in the upper part of FIG. 8, the resolution of the first three low-resolution data is reduced to half of that of original RGB image data. In addition, the three binary data subsequent to the three low-resolution data is subjected to a binarization according to the arrangement of black and white pixels. That is, before the resolution reduction and the binarization are executed, the data shown in the upper part of FIG. 8 includes 24 (=12 in a row×2 in a column) pixels, each of which has 8-bit data for each R, G, and B. Accordingly, the original RGB image data has a data capacity corresponding to 576 bits (=8 bits×3 colors×24). Thus, according to the run-length compression in the present embodiment, since the data is compressed up to 48 bits, the data capacity after the run-length compression is reduced to 1/10 or less of the original data capacity. As a result, the data capacity can be greatly reduced.

Figure 9:
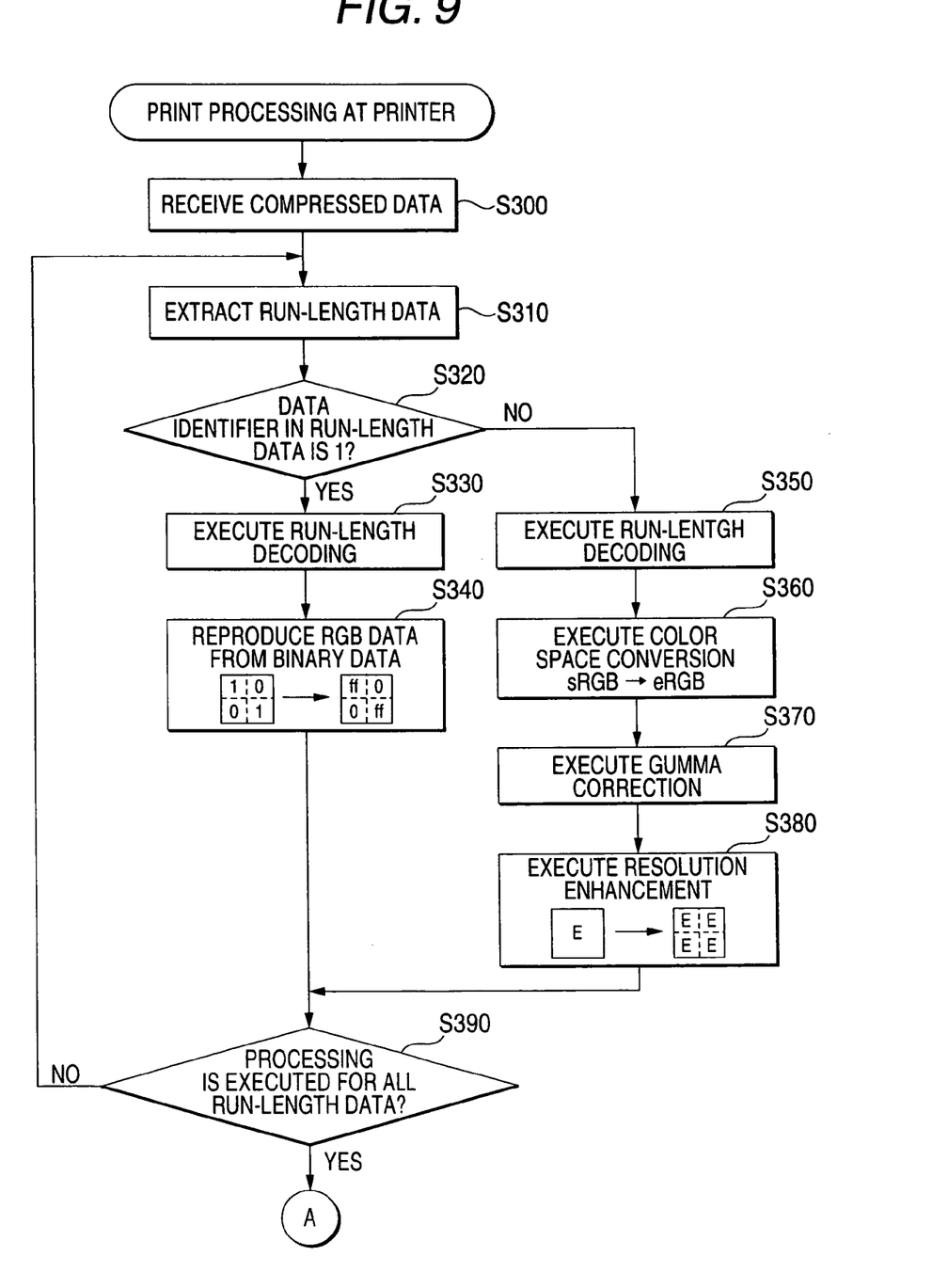
FIGS. 9 and 10 are flowcharts showing print processing executed by a printer in the printing system.
Figure 10:
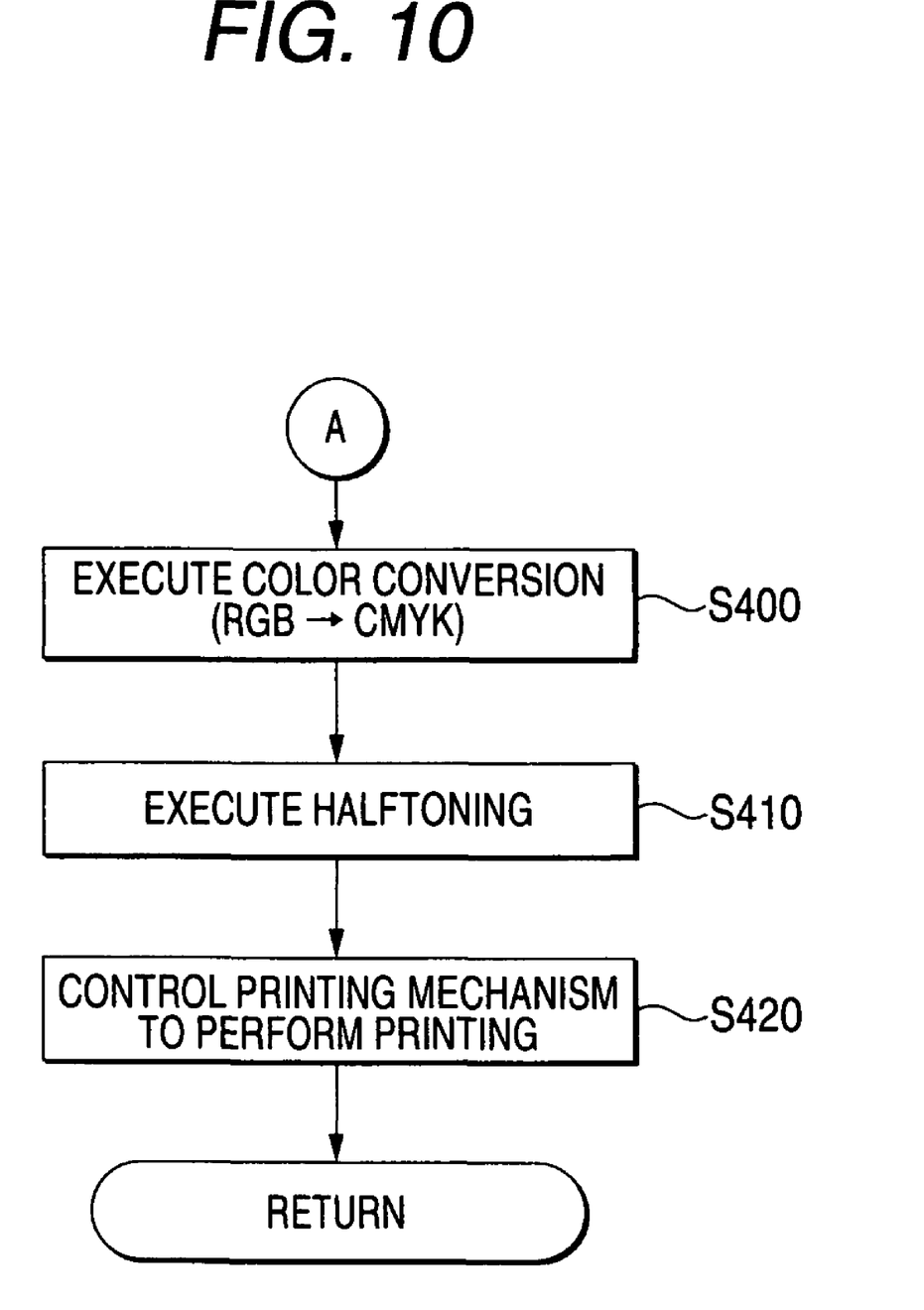

FIGS. 9 and 10 show a print processing executed at the printer 300 side. This processing is executed by the CPU 340 of the printer 300 when the printer 300 receives compressed data from the computer 200.

When the print processing is executed, first, the CPU 340 of the printer 300 receives the compressed data, which is transmitted from the computer 200, through the USB interface 370 (step S300).

When the CPU 340 receives the compressed data, a run-length data item included in the compressed data is extracted (step S310). The run-length data is data including a set of counter section and data section, as described above.

When the run-length data is extracted, the CPU 340 determines whether or not a data identifier set in the counter section is '1' indicating binary data (step S320).

As a result of the determination in step S320, if it is determined that the data identifier is '1' (step S320: Yes), the CPU 340 determines that the run-length data extracted in step S310 is data obtained by compressing binary data and then performs a run-length decoding on the binary data, on the basis of the continuous number RL1 or the discontinuous number RL0 indicated by the counter section and the data section configured in the unit of 4 bits, by using the decoder 342 (step S330).

When the run-length decoding on the binary data is completed, the CPU 340 reproduces the decoded binary data as RGB data having 2×2 pixels by using the image reproducer 344 (step S340). That is, of the binary data, an RGB value with respect to a pixel set as '1' is set to a white color, and an RGB value with respect to a pixel set as '0' is set to a black color. Thus, a conversion inverse to the conversion to the binary data shown in FIG. 3 is executed.

As a result of the determination in step S320, if it is determined that the data identifier is '0' (step S320: No), the CPU 340 determines that the run-length data extracted in step S310 is data obtained by compressing low-resolution data and then performs a run-length decoding on the low-resolution data, on the basis of the continuous number RL1 or the discontinuous number RL0 indicated by the counter section and the data section configured in the unit of 24 bits (in the unit of 8 bits for each R, G, and B), by using the decoder 342 (step S350).

When the run-length decoding on the low-resolution data is completed, the CPU 340 performs the following processing on the decoded low-resolution data by using the image reproducer 344 (steps S360 to S380). Specifically, first, the CPU 340 performs a color space conversion on the decoded low-resolution data (step S360). In the color space conversion, RGB data displayed in the sRGB color space supported by the digital camera 500 or the computer 200 is converted to be displayed in the eRGB color space supported by the printer 300. The eRGB color space is a color space having a color reproduction region larger than the sRGB color space.

After performing the color space conversion, the CPU 340 performs a gamma correction according to a coloring characteristic of the printer 300 with respect to the RGB data whose color space has been converted, so as to obtain an optimal color at the time of printing by the printer 300 (step S370). Furthermore, since color tones of black and white pixels are not changed even if the color space conversion or the gamma correction is executed on the black and white pixels, these processings with respect to the binary data converted to RGB data in step S340 are omitted. Thus, a high-speed processing can be realized.

After performing the gamma correction, the CPU 340 performs a resolution enhancement on each pixel having been subjected to the gamma correction (step S380). The low-resolution data is generated by averaging the gradation values of 2×2 pixels in the print processing at the computer 200 side. Accordingly, in the resolution enhancement, 1×1 pixel (360 dpi×360 dpi) is divided into 2×2 pixels (720 dpi×720 dpi) and RGB data of each original pixel is directly applied as RGB data of each pixel. In the resolution enhancement, since the number of pixels simply increases without changing RGB values, it is possible to perform the resolution enhancement at high speed. By the processing described above, the low-resolution data has the same resolution as the binary data.

After performing the conversion from binary data to RGB data in step S340 or the resolution enhancement in step S380, the CPU 340 determines whether or not the processing has been completed with respect to all run-length data of the compressed data (step S390). As a result of the determination, if it is determined that the processing has not been completed with respect to all run-length data (step S390: No), the processing returns to step S310 in which next run-length data is extracted from the compressed data and then the processings described above are repeated.

In step S390, if it is determined that the processing has been completed with respect to all run-length data (step S390: Yes), the compressed data, which has been received from the computer 200 in step S300, is reconstructed as RGB image data input in step S100 of the computer-side print processing described above. For this reason, the CPU 340 performs a color conversion of converting the RGB image data, which has been obtained by the above-described processings, to CMYK data suitable for the print processing executed by the printer 300 (step S400 of FIG. 10).

After completing the color conversion, the CPU 340 performs a halftoning on the color-converted CMYK data (step S410). The halftoning is a processing of expressing gradation values of CMYK on the basis of distribution of dots, that is, on/off of a dot. As the halftoning, for example, a dither method, an error diffusion method, an averaged error minimizing method, or a method that is filed by an applicant of the present invention and is disclosed in International Patent Publication No. WO2004/086750 may be applied.

Finally, the CPU 340 controls the printing mechanism 310 according to the on/off data of dots obtained as a result of the halftoning so that ink is ejected onto the printing sheet P, thereby performing a color printing. By the processings described above, the print processing of the printing system 100 is completed.

According to the above-described printing system 100 in the present embodiment, by a simple determination processing on whether or not a pixel group is composed of black and white pixels, it is possible to dynamically change the resolution of a black and white portion displaying a character or the like and the resolution of other portions displaying a natural image or the like.

In addition, if a pixel group, which is composed of 2×2 pixels, extracted from image data is a black and white pattern, a binarization can be executed while maintaining the resolution of 720 dpi×720 dpi. On the other hand, if the pixel group is not the black and white pattern, the resolution corresponding to the pixel group may be reduced to 360 dpi×360 dpi. Accordingly, while reducing the entire data capacity, a print processing with respect to the black and white portion displaying a character or the like may be executed without deteriorating the image quality.

Furthermore, in the present embodiment, the binary data or the low-resolution data obtained by reducing data capacity is subjected to the run-length compression according to a continuous number or a discontinuous number thereof. For this reason, the data capacity can be further reduced.

Furthermore, in the present embodiment, even for a portion, such as a character of an image, displayed by the binary data and a portion, such as a natural image, displayed by the low-resolution data, the run-length compression, which is the same compression method, is executed. Accordingly, the capacity of the entire image data can be reduced with a simple configuration.

Furthermore, in the present embodiment, when the print processing is executed by the printer 300, the color conversion or the gamma correction is executed with respect to a portion, such as a natural image, displayed by the low-resolution data, thereby enhancing the color reproducibility. On the other hand, since the color tones of black and white portions, such as a character, displayed by the binary data, are not changed even if the color space conversion or the gamma correction is executed for the black and white portions, these processings are omitted with respect to the black and white portions displayed by the binary data. Accordingly, in the present embodiment, it becomes easy to perform the color space conversion or the gamma correction for only necessary portions other than the black and white portions due to the characteristic of algorithm in which data capacity is reduced by separating image data into the black and white portions and other portions. As a result, since the color space conversion or the gamma correction can be efficiently executed, it is possible to perform the printing at high speed.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention. For example, a function realized by software may be implemented by hardware.

In the embodiment described above, the printing system 100 is configured to include the computer 200 and the printer 300. However, the printing system 100 may be configured to include only the printer 300. That is, by allowing the printer 300 to include the card reader 400, image data stored in the memory card MC may be directly input to the printer 300 through the card reader 400. Then, the CPU 340 of the printer 300 may perform the print processing at the computer side shown in FIG. 2. Thus, it becomes possible to reduce the capacity of data temporarily stored in the RAM 360 of the printer 300, which makes it possible to save cost due to a memory.

In the embodiment described above, both the pixel group composed of only white pixels and the pixel group composed of only black pixels have been assumed to be black and white patterns. However, the pixel group composed of only white pixels and the pixel group composed of only black pixels may not be assumed to be black and white patterns. Accordingly, the binarization may be executed for only a portion, such as a character, having a black and white edge.

In the embodiment described above, the computer 200 performs the binarization and the low-resolution processing on pixel groups, performs the run-length compression, and then transmits the compressed data to the printer 300. However, since original RGB image data is compressed to data having the data amount corresponding to at the least a quarter of that of the original RGB image data even by the binarization and the low-resolution processing, the computer 200 may directly transmit the binarized data and the low-resolution data to the printer 300 without the run-length compression. According to the configuration described above, the printing system 100 may omit processings related to the run-length compression and the decoding. For this reason, if an interface that connects the computer 200 and the printer 300 to each other has a sufficient communication band, the print processing can be executed at high speed.

In the embodiment described above, as shown in FIG. 2, after the run-length compression with respect to all pixel groups has been compressed at the computer 200 side, the compressed data is transmitted to the printer 300. However, once each run-length data item is generated, each of the run-length data items may be transmitted to the printer 300, without waiting for generation of compressed data to be completed. Furthermore, in the case, the printer 300 may perform the print processing by performing a decoding, a color conversion, or a halftoning in a streaming manner while receiving the run-length data. With such configuration, a printing time period can be further reduced.

In the embodiment described above, the data length of the run-length data is indicated by setting the continuous number RL1 or the discontinuous number RL0 in the counter section of the run-length data. However, the data length of the run-length data may be indicated by setting a symbol, which indicates a start point, at a first bit or byte of the run-length data and setting a symbol, which indicates an end point, at a last bit or byte of the run-length data.

The disclosure of Japanese Patent Application No. 2005-297276 filed Oct. 12, 2005 including specification, drawings and claims is incorporated herein by reference in its entirety.

What is claimed is:

1. A method of processing image data including a plurality of pixels, comprising:
    extracting a plurality of pixel groups sequentially, each of the pixel groups including a plurality of pixels, from the image data stored in a storage;
    judging whether each of the pixel groups includes only at least one of a white pixel and a black pixel;
    binarizing at least one first pixel group in the pixel groups in accordance with an arrangement of the at least one of the white pixel and the black pixel therein, in a case where it is judged that the first pixel group includes only at least one of the white pixel and the black pixel, thereby generating at least one first data item;
    reducing a first resolution of at least one second pixel group in the pixel groups to a second resolution, in a case where it is judged that the second pixel group includes at least one pixel other than the white pixel and the black pixel, thereby generating at least one second data item;
    compressing the first data item and the second data item by a processor;
    counting a first number that a plurality of first data items having the same value are generated consecutively;
    counting a second number that a plurality of the second data items having the same value are generated consecutively;
    compressing the first data items in accordance with the first number, in a case where the first number is obtained, thereby generating first compressed data
    compressing the second data items in accordance with the second number, in a case where the second number is obtained, thereby generating second compressed data;
    counting a third number that a plurality of first data items having different values are generated consecutively;
    counting a fourth number that a plurality of the second data items having different values are generated consecutively;
    compressing the first data items in accordance with the third number, in a case where the third number is obtained, thereby generating third compressed data;
    compressing the second data items in accordance with the fourth number, in a case where the fourth number is obtained, thereby generating fourth compressed data; and
    transmitting at least one of the first compressed data, the second compressed data, the third compressed data and the fourth compressed data to an outputting apparatus connected to the processor and configured to output an image, wherein:

the first compressed data is generated to include a first identifier indicative of the first data item and first count data indicative of the first number, the second compressed data is generated to include a second identifier indicative of the second data item and second count data indicative of the second number, the third compressed data is generated to include the first identifier and third count data indicative of the third number, and the fourth compressed data is generated to include the second identifier and fourth count data indicative of the fourth number.

2. The method as set forth in claim 1, wherein:

a data length of the third count data is different from a data length of the fourth count data; and a data length of the third compressed data is different from a data length of the fourth compressed data.

3. An apparatus, operable to process image data including a plurality of pixels, comprising:

an extractor that extracts a plurality of pixel groups, each of which includes a plurality of pixels, from the image data sequentially;

a judge that judges whether each of the pixel groups includes only at least one of a white pixel and a black pixel;

a binarizer that binarizes at least one first pixel group in the pixel groups in accordance with an arrangement of the at least one of the white pixel and the black pixel therein, in a case where the judge judges that the first pixel group includes only at least one of the white pixel and the black pixel, thereby generating at least one first data item; and a resolution reducer that reduces a first resolution of at least one second pixel group in the pixel groups to a second resolution, in a case where the judge judges that the second pixel group includes at least one pixel other than the white pixel and the black pixel, thereby generating at least one second data item; and a processor that compresses the first data item and the second data item, wherein the processor includes:

a first counter that counts a first number that a plurality of first data items having the same value are generated consecutively;

a second counter that counts a second number that a plurality of the second data items having the same value are generated consecutively;

a first compressor that compresses the first data items in accordance with the first number, in a case where the first number is obtained, thereby generated first compressed data;

a second compressor that compresses the second data items in accordance with the second number, in a case where the second number is obtained, thereby generating second compressed data;

a third counter that counts a third number that a plurality of first data items having different values are generated consecutively;

a fourth counter that counts a fourth number that a plurality of the second data items having different values are generated consecutively;

a third compressor that compresses the first data items in accordance with the third number, in a case where the third number is obtained, thereby generating third compressed data; and a fourth compressor that compresses the second data items in accordance with the fourth number, in a case where the fourth number is obtained, thereby generating fourth compressed data, wherein the first compressed data is generated to include a first identifier indicative of the first data item and first count data indicative of the first number, the second compressed data is generated to include a second identifier indicative of the second data item and second count data indicative of the second number, the third compressed data is generated to include the first identifier and third count data indicative of the third number, and the fourth compressed data is generated to include the second identifier and fourth count data indicative of the fourth number.

4. The apparatus as set forth in claim 3, wherein:

a data length of the third count data is different from a data length of the fourth count data; and a data length of the third compressed data is different from a data length of the fourth compressed data.

* * * * *